Nov. 30, 1965        G. J. POSAKONY        3,220,249
CALIBRATED ULTRASONIC INSPECTION DEVICE
Filed Aug. 23, 1960
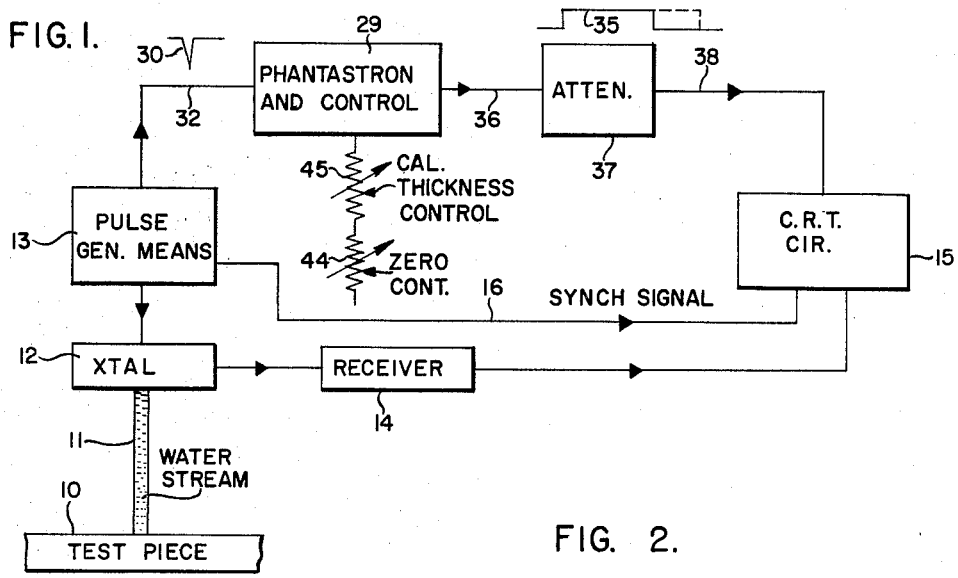
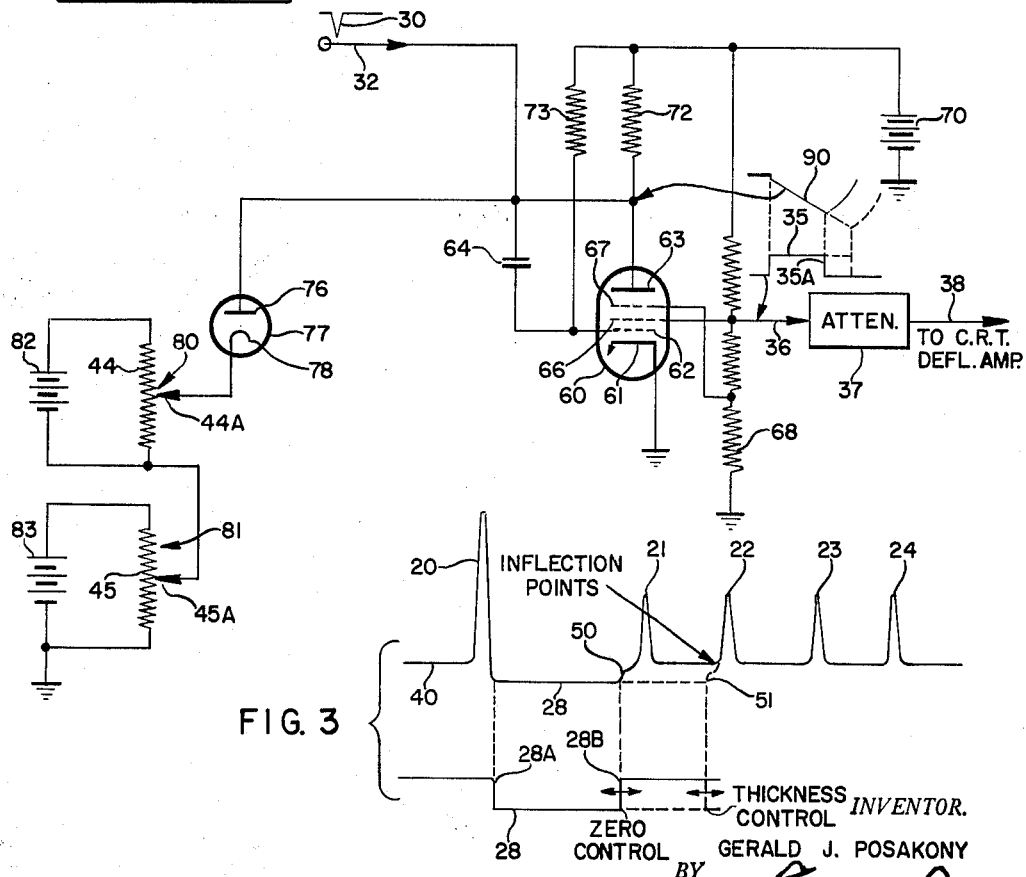
INVENTOR.
GERALD J. POSAKONY
BY
ATTORNEYS United States Patent Office 3,220,249
Patented Nov. 30, 1965

3,220,249
CALIBRATED ULTRASONIC INSPECTION DEVICE
Gerald J. Posakony, Boulder, Colo., assignor, by mesne assignments, to Automation Industries, Inc., El Segundo, Calif., a corporation of California
Filed Aug. 23, 1960, Ser. No. 51,339
3 Claims. (Cl. 73—67.8)

The present invention relates to systems for inspecting metal for flaws and thickness and particularly to systems of this character incorporating means for accurately establishing distances on a related time base scale.

In prior art systems of this character a metal test piece is subjected to recurrent pulses and the resulting reflections from the front and back faces of the test piece, as well as discontinuities, inhomogeneities and the like (referred to broadly as flaws), produce corresponding deflections of time base sweeps developed synchronously with such pulses. Difficulties have heretofore been encountered in accurately measuring actual distances to such flaws or thickness of the material itself. These difficulties arise not only from the fact that two differently appearing standards are compared as, for example, when a pip on the screen is compared with indicia on a measuring ruler or scale and particularly so when there is some instability in the electrical system, but also mainly from the fact that the time base sweeps themselves are not linear, i.e., all incremental measured distances therealong do not represent the same time of travel or distance of travel of the energy through the material. This latter inaccuracy is more pronounced when a water stream is used between the pulse-generating means and the test piece and even more so when determinations are made with respect to subsequent or so-called multiple reflections of energy in the test piece occurring at a still later time after initiation of the time base sweep which usually becomes more progressively non-linear.

It is therefore an object of the present invention to provide improved means and techniques whereby the above-mentioned difficulties are obviated.

A specific object of the present invention is to provide an accurate time or distance-measuring arrangement incorporated as an integral part of a metal testing system.

Another specific object of the present invention is to provide a metal inspection system of this character whereby like indications, i.e., changes in deflection of a cathode ray beam, may be compared for more accurate determinations than heretofore possible.

Another specific object of the present invention is to provide a metal inspection system of this character using an adjustable so-called zero control for establishing a particular reference point which operates in conjunction with a second adjustable and calibrated control for accurately establishing time differences or distances with respect to such adjusted reference point.

Another specific object of the present invention is to provide novel circuitry involving the use of a phantastron for accomplishing these purposes.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates a metal inspection system embodying features of the present invention.

FIGURE 2 illustrates the circuitry of the phantastron and control which is indicated as such in FIGURE 1.

FIGURE 3 illustrates the type of representation produced on the cathode ray tube (C.R.T.) in the system shown in FIGURE 1 and is used also to illustrate the functioning of the circuitry in FIGURE 2.

Referring to the drawings, FIGURE 1 shows the metal inspection system for determining thicknesses and flaws in a metal test piece 10 which has recurrent pulses of energy supplied thereto through a water stream 11 from a crystal transducer 12 operating at a frequency of, for example, 10 megacycles, the crystal 12 being recurrently excited by conventional pulse-generating means 13 to periodically supply 10-megacycle energy to the test piece 10. The same crystal transducer 12 is excited by the resulting returning echoes from the front and back faces of the test piece as well as the flaws therein to develop corresponding voltages which are amplified in receiver 14 before being applied to the vertical deflection circuit of the cathode ray tube circuit 15. These voltages produce deflections in a time base sweep developed in the cathode ray tube circuit, such time base sweeps being recurrently produced in synchronism with pulses developed in pulse-generating means 13 and applied as a synch signal via connection 16 to the horizontal deflection circuit of the C.R.T.

The resulting display on the C.R.T. is indicated in FIGURE 3 wherein the first deflection 20 represents the main transmitted energy pulse or "main bang," the second deflection 21, occurring sometime later due to the presence of water path 11, represents the reflection from the front face of test piece 10, the third deflection 22 represents the reflection from the back face of test piece 10; and the deflections 23 and 24 represent subsequent so-called multiple reflections from the front and back faces respectively resulting from reverberation of the originally supplied energy inside the metal test piece.

Also visible on the same cathode ray tube 15, as also indicated in FIGURE 3, is an adjustable length trace 28 produced by the same cathode beam in accordance with operation of the phantastron circuit 29 which is supplied a sharp negative trigger 30 developed in pulse-generating means 13 over connection 32 and which produces in timed relationship therewith an adjustable length voltage wave 35 on connection 36, such voltage wave 35 being attenuated somewhat in attenuating means 37 before being applied over connection 38 to the vertical amplifier in the cathode ray tube circuit 15 wherein the same undergoes polarity reversal so as to produce the corresponding negative going trace 28, i.e., a trace 28 below the zero line 40.

The leading edge 28A of trace 28 may be initiated substantially simultaneously with the "main bang" 20 as indicated in FIGURE 3 and the position of trailing edge 28B is adjustably controlled by the two controls 44 and 45 in the phantastron circuit, referred to respectively as the "zero" control 44 and "thickness" control 45. The "zero" control 44 is used to establish a reference point after which the "thickness" control 45, a calibrated control, is used to establish distances or time with respect to such reference point.

For these purposes, the apparatus is preferably operated such that an inflection point, such as an inflection point shown at 50 and 51, is produced on the cathode ray tube, such inflection point being produced by a merging of the trailing edge 28B of trace 28 with the leading edge of one of the pips 21, 22, 23 or 24, as the case may be, and manifesting itself generally as a point about which reverse curvature in the composite trace occurs.

The "zero" control 44 may be a simple uncalibrated potentiometer-type resistance having its adjustable tap movable through less than 360 degrees while the "thickness" control 45 may be a 10-turn multiturn precision potentiometer having the angular positions of its multiturn wiper arm calibrated directly in terms of either distance or time.

Thus, for example, in determining the time or distance between pips 21 and 22, i.e., the thickness of the test material, the control 44 is adjusted to produce the inflection point 50 and the reading on the other control 45 is noted. Then the trace 28 is lengthened by adjustment of control 45, as indicated in dotted lines in FIGURE 3, to produce the inflection point 51 and the resulting difference in readings on the calibrated control 45 is an accurate measurement of the time interval or distance between the two pips 21 and 22.

For these purposes the phantastron circuit now described in connection with FIGURE 2 is used. This circuit includes a pentode-type tube 60 having its cathode 61 grounded, its grid 62 coupled to its anode 63 by condenser 64, and its screen grid 66 and suppressor grid 67 are connected respectively to points of higher and lower potential on a voltage-dividing resistance 68 which has one of its outside terminals ground and the other one of its outside terminals connected to the ungrounded positive terminal of supply source 70. Voltage-dropping resistances 72 and 73 each have one of their terminals connected to such positive terminal of source 70 and have their other terminals connected respectively to anode 63 and grid 62. The anode 63 is also connected to the anode 76 of the diode 77, the cathode 78 of the diode being returned to ground through a pair of series-connected adjustable voltage sources 80 and 81, adjustment of which is effected by adjustment of the taps 44A and 45A respectively of the aforementioned potentiometer-type resistance controls 44 and 45. It is noted that for these purposes the voltage source 82 has its terminals connected to corresponding outside terminals of resistance 44 and that the voltage source 83 has its terminals connected to the outside terminals of resistance 45, and the negative terminal of the source 83 is grounded.

The negative input trigger voltage 30 is applied via connection 32 to the anode 63 and the output voltage 35 of adjustable duration is developed on the screen grid 66 and applied to connection 36, the particular duration of such voltage being established by adjustment of the taps 44A and 45A.

Briefly, the operation of the circuit shown in FIGURE 2 may be described as follows. In the quiescent state the voltage on anode 63 is relatively high since only a very small current, if any, flows through resistance 72 due to the relatively large current flowing to the screen grid 66 and isolating effect of suppressor grid 67. This means that at this time the voltages on screen grid 66 and suppressor grid 67 are each relatively low and that the voltage on control grid 62 is practically zero. Upon application of the negative trigger 30 to anode 63, the cathode current is reduced and consequently the voltage on screen grid 66 rises sharply. This rise in screen grid voltage is transmitted to the suppressor grid to raise the suppressor grid voltage about a point corresponding to anode current cutoff and consequently current begins flowing in increasing amounts through resistance 72 to the anode 63 to correspondingly change the voltage on grid 62 and to initiate a negative going very linear sawtooth-type voltage wave 90 to thereby continuously depress the voltage on anode 63 to a point where the same is prevented from changing further by the voltage supplied from the two series-connected adjustable sources 80 and 81. At this point the positive going wave 35 being developed on the screen grid is sharply interrupted, forming the useful trailing edge 35A. The time reference of this trailing edge is thus adjustable by adjustment of voltage sources 80 and 81, i.e., taps 44A and 45A, for the above purposes. It is noted that the diode 77, a unidirectional device, prevents the sources 80 and 81 from supplying current to anode 63 to assure this mode of operation.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. In a material inspection system, wherein echoes from the front and a reflecting surface within the material are displayed on a cathode ray tube and the time between these echoes is measured by an adjustable marker, the combination comprising,
    pulse-generating means developing ultrasonic energy,
    receiver means,
    a transducer coupled to said generating means and said receiver means for conveying energy from said generating means to a test piece and for transferring resulting reflected energy from said test piece to said receiver means,
    visual cathode beam indicating means coupled to said receiver means and including a cathode beam deflecting means,
    means coupled to said generating means and operating one of said beam-deflecting means in timed relationship with said generating means to develop time base sweeps on said indicating means,
    adjustable control means coupled to said generating means and operating the other of said beam-deflecting means in timed relationship with said generating means,
    the output of said receiver means being also coupled to said other beam deflecting means where signals from said receiver means and said control means jointly act on the cathode beam of said indicating means to produce visual indications of reflections from the front surface and from a reflecting surface in said test piece with said visual indications being altered by an elongated marker signal developed in said control means in timed relationship with said generating means,
    said marker signal having a trailing edge, and
    variable means incorporated in said control means and operative upon a first adjustment to vary the length of said marker signal for producing coincidence between the trailing edge of said marker signal and the visual indications of reflections from said front surface and operative upon a second adjustment to vary the length of said marker signal to produce coincidence between the trailing edge and the visual indications from said reflecting surface,
    said adjustable means incorporating a calibrated scale, differences in reading on which when said marker signal is so adjusted for successive coincidence is a measure of the distance between said front and said reflective surface in said test piece.

2. A system as set forth in claim 1, including a first portion in said variable means serving as a "zero" control to adjust the length of said marker signal for producing the first coincidence condition of said trailing edge with one of said visual indications, and
    a second portion in said variable means serving as a "thickness" control for producing the second coincidence condition of said trailing edge with the other visual indication, said second portion having a calibrated scale.

3. A system as set forth in claim 1 in which said variable means includes a multiturn potentiometer type resistance.

(References on following page)

References Cited by the Examiner

UNITED STATES PATENTS

| | | | |
|---|---|---|---|
| 2,402,917 | 6/1946 | Miller. | |
| 2,448,363 | 8/1948 | Firestone et al. | 73—67.7 X |
| 2,871,404 | 1/1959 | Mugele | 73—67.7 X |
| 2,921,466 | 1/1960 | Nerwin | 73—67.8 |
| 2,949,028 | 8/1960 | Joy. | |
| 3,050,990 | 8/1962 | Renaut | 73—67.8 |

OTHER REFERENCES

Pages 416–426, Active Networks, by Rideout, a textbook published in 1954 by Prentice-Hall.

Book: Waveforms, by Chance et al., published by McGraw-Hill Book Company, Inc., New York, 1949, pp. 195–204 relied on.

RICHARD C. QUEISSER, *Primary Examiner*.

C. A. CUTTING, ROBERT L. EVANS, *Examiners*.